United States Patent

Marchand et al.

[11] Patent Number: 4,734,390
[45] Date of Patent: Mar. 29, 1988

[54] NITROGEN OR OXNITROGEN COMPOUNDS HAVING A PEROVSKYTE STRUCTURE, THEIR PREPARATION AND THEIR APPLICATION TO THE MANUFACTURE OF DIELECTRIC COMPONENTS

[75] Inventors: Roger Marchand; Yves Laurent, both of Cesson Sevigne, France

[73] Assignee: Centre National de la Recherche Scientifique (CNRS), France

[21] Appl. No.: 794,633

[22] Filed: Nov. 4, 1985

[30] Foreign Application Priority Data

Nov. 13, 1984 [FR] France .................. 84 17274

[51] Int. Cl.⁴ ............................................. C01B 21/26
[52] U.S. Cl. ..................................... 501/96; 361/321; 423/371; 423/385
[58] Field of Search ................ 423/371, 385; 501/96

[56] References Cited

U.S. PATENT DOCUMENTS 3,326,820 6/1967 Cuomo et al. ................. 423/412

FOREIGN PATENT DOCUMENTS 1429307 11/1964 France ........................ 423/371

Primary Examiner—William R. Dixon, Jr.
Assistant Examiner—Wayne A. Langel
Attorney, Agent, or Firm—Handal & Morofsky

[57] ABSTRACT

The present invention relates to new nitrogen or oxynitrogen compounds of perovskite structure, corresponding to the general formula I:

$$ABO_{3-n}N_n \qquad (I)$$

in which:
the cationic lattice consists of:
  a metal cation A chosen from the group comprising: $Li^+$, $Na^+$, $K^+$, $Rb^+$, $Cs^+$, $Ag^+$, $Tl^+$, $Ca^{2+}$, $Ba^{2+}$, $Sr^{2+}$, $Pb^{2+}$, $Cd^{2+}$, $Ln^{3+}$, $Bi^{3+}$, $Y^{3+}$, $Th^{4+}$, $U^{4+}$, trans-$U^{4+}$; and
  a metal cation B chosen from the group comprising: $W^{6+}$, $Re^{6+}$, $Mo^{6+}$, $Ta^{5+}$, $Nb^{5+}$, $Mo^{5+}$, $W^{5+}$, $Ti^{4+}$, $Zr^{4+}$, $Sn^{4+}$, $Ge^{4+}$, $Nb^{4+}$, $Ta^{4+}$, $Al^{3+}$, $Ga^{3+}$, $In^{3+}$, $Tl^{3+}$, $Fe^{3+}$, $Cr^{3+}$;
$n = 1$, 2, or 3, and
the cationic charges a of the metal A and b of the metal B satisfy the equations:

$$a + b = 6 + n$$

$$a \geq n,$$

and the solid solutions of these compounds.

15 Claims, 1 Drawing Figure

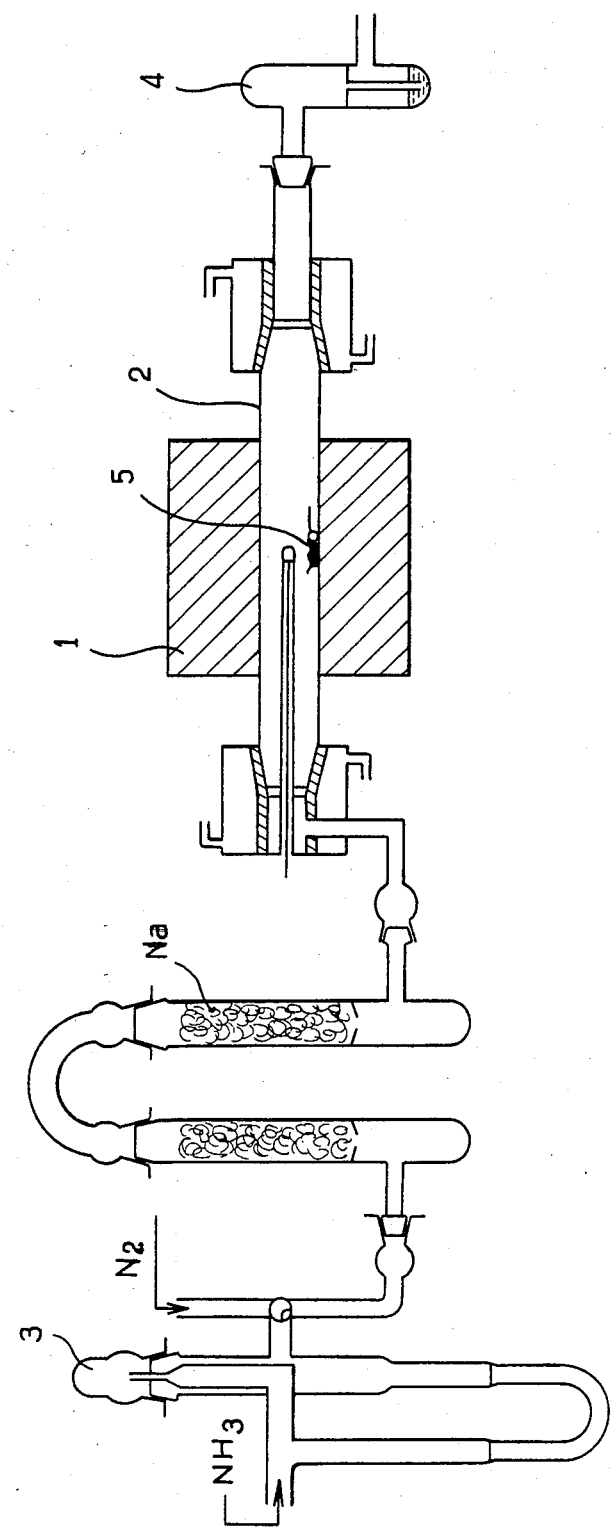

NITROGEN OR OXNITROGEN COMPOUNDS HAVING A PEROVSKYTE STRUCTURE, THEIR PREPARATION AND THEIR APPLICATION TO THE MANUFACTURE OF DIELECTRIC COMPONENTS

The present invention relates to new nitrogen or oxynitrogen compounds having a perovskite structure, their preparation and their application to the manufacture of dielectric components.

Passive electronic components are generally manufactured using oxides. Thus, one of the most widely known and most commonly used dielectric materials in the manufacture of ceramic capacitors is barium titanate ($BaTiO_3$), which possesses a perovskite structure. It has already been proposed also to replace all or part of the barium with strontium or lead and all or part of the titanium with zirconium, which has a particular influence on the transition temperature between the ferroelectric and para-electric domains.

Converting a material of this type into ceramic requires a sintering operation, which must be carried out at high temperature. Moreover, it is necessary to carry out the process under an oxygen atmosphere in order to avoid stoichiometric defects detrimental to the dielectric properties of the ceramic.

Working at elevated temperature (of the order of 1200° C.) and under oxygen considerably limits the number of metals which can be used in film-type capacitors. Platinum, for example, is suitable but its high cost is dissuasive as regards industrial-scale manufacture. The use of additives, such as $Bi_2O_3$, $CaF_2$ or LiF, makes it possible to lower the sintering temperature and hence to use alloys such as platinum/palladium or palladium/silver composites, although these are still too expensive.

The object of the present invention was to obtain nitrogen or oxynitrogen dielectric materials which, for their sintering, require not an oxygen atmosphere but an inert atmosphere, for example a nitrogen atmosphere. It thus becomes possible to use less noble metals or alloys. Nitride compounds which are stable under a nitrogen or ammonia atmosphere satisfy this condition perfectly.

The sole FIGURE of the Drawings illustrates schematically the equipment used for preparing $BaTaO_2N$ from oxygen derivatives, in accordance with the present invention.

The introduction of nitrogen into the anionic lattice of an oxide causes an increase in negative charge, which requires, in the cationic lattice, the parallel replacement of an element of given oxidation state with a different element of higher oxidation state.

Thus, considering barium titanate, $BaTiO_3$, replacement of part of the oxygen with nitrogen must be concomitantly accompanied by the replacement of Ba with a trivalent element or of Ti with an element of oxidation state V. These substitutions may be simultaneous or separate. Other possibilities of intermediate substitutions have been envisaged as well. The anionic lattice of a perovskite $ABX_3$ is actually formed of three atoms. If these consist of three oxygen atoms, for example as in $BaTiO_3$, the anionic charge is equal to −6. Total replacement of the oxygen with nitrogen leads to a charge of −9. Compensation of the cationic lattice is provided by cations which must also process ionic radii compatiable with the coordination number of the A and B sites of the perovskite structure.

It will be pointed out briefly here that compounds with a perovskite structure correspond to the general formula $ABX_3$, A and B denoting cations and X denoting anions. The ideal perovskites crystallize in the cubic system (space group Pm3m). In the case of the compound $SrTiO_3$, for example, the structure consists of a three-dimensional arrangement of $TiO_6$ octahedra, the vertices of which are common to two octahedra, giving the stoichiometry $TiO_3$. This arrangement of octahedra produces a site of coordination number 12 at the center of the cube, which is occupied by the type-B cation, in this particular case strontium.

In general, the following two conditions must be satisfied in order to obtain this structural type for a compound of the formula $ABX_3$:

(1) Geometrical condition

The ionic radii are related by the following equation:

$$rA + rX = (rB + rX)\sqrt{2} \times t,$$

t being a tolerance factor of about 1.

(2) Electrostatic condition

The sum of the cationic charges must always be equal to the sum of the anionic charges. In the case of a perovskite purely containing oxygen, the electrostatic condition is therefore $A+B=6+$.

Replacement of the oxygen with nitrogen results in an increase in the anionic charge which has to be compensated in the cationic lattice.

The nitrogen or oxynitrogen compounds of perovskite structure which form the subject of the present invention correspond to the general formula I:

$$ABO_{3-n}N_n \qquad (I)$$

in which:
the cationic lattice consists of:
a metal cation A chosen from the group comprising: $Li^+$, $Na^+$, $K^+$, $Rb^+$, $Cs^+$, $Ag^+$, $Tl^+$, $Ca^{2+}$, $Ba^{2+}$, $Sr^{2+}$, $Pb^{2+}$, $Cd^{2+}$, $Ln^{3+}$, $Bi^{3+}$, $Y^{3+}$, $Th^{4+}$, trans-$U^{4+}$; and
a metal cation B chosen from the group comprising: $W^{6+}$, $Re^{6+}$, $Mo^{6+}$, $Ta^{5+}$, $Nb^{5+}$, $Mo^{5+}$, $W^{5+}$, $Ti^{4+}$, $Zr^{4+}$, $Sn^{4+}$, $Ge^{4+}$, $Nb^{4+}$, $Ta^{4+}$, $Al^{3+}$, $Ga^{3+}$, $In^{3+}$, $Tl^{3+}$, $Fe^{3+}$, $Cr^{3+}$;
n=1, 2 or 3,
it also being understood that, on the one hand, the atomic ratio A/B can vary slightly on either side of the ideal value 1 and, on the other hand, the anionic lattice can be slightly deficient, and
the cationic charges a of the metal A and b of the metal B satisfy the equations:

$$a+b=6+n$$

$$a \geq n.$$

According to a particular characteristic of the present invention, the oxynitrogen compounds correspond to the general formula Ia:

$$ABO_2N \qquad (Ia)$$

in which:
the metal cation A is chosen from the group comprising: $Li^+$, $Na^+$, $K^+$, $Rb^+$, $Cs^+$, $Ag^+$, $Tl^+$, $Ca^{2+}$, $Ba^{2+}$, $Sr^{2+}$, $Pb^{2+}$, $Cd^{2+}$, $Ln^{3+}$, $Bi^{3+}$, $Y^{3+}$, $Th^{4+}$, $U^{4+}$, trans-$U^{4+}$; and the metal cation B is chosen from the group comprising: $W^{6+}$, $Re^{6+}$, $Mo^{6+}$, $Ta^{5+}$, $Nb^{5+}$, $Mo^{5+}$, $W^{5+}$, $Ti^{4+}$, $Zr^{4+}$, $Sn^{4+}$, $Ge^{4+}$, $Nb^{4+}$, $Ta^{4+}$, $Al^{3+}$, $Ga^{3+}$, $In^{3+}$, $Tl^{3+}$, $Fe^{3+}$, $Cr^{3+}$.

According to a particular characteristic of the present invention, the oxynitrogen compounds correspond to the general formula Ib:

$$ABON_2 \qquad (Ib)$$

in which:
the metal cation A is chosen from the group comprising: $Ca^{2+}$, $Ba^{2+}$, $Sr^{2+}$, $Pb^{2+}$, $Cd^{2+}$, $Ln^{3+}$, $Bi^{3+}$, $Y^{3+}$, $Th^{4+}$, $U^{4+}$, trans-$U^{4+}$; and the metal cation B is chosen from the group comprising: $W^{6+}$, $Re^{6+}$, $Mo^{6+}$, $Ta^{5+}$, $Nb^{5+}$, $Mo^{5+}$, $W^{5+}$, $Ti^{4+}$, $Zr^{4+}$, $Sn^{4+}$, $Ge^{4+}$, $Nb^{4+}$, $Ta^{4+}$.

According to another particular characteristic of the present invention, the nitrogen compounds correspond to the general formula Ic:

$$ABN_3 \qquad (Ic)$$

in which:
the metal cation A is chosen from the group comprising: $Ln^{3+}$, $Bi^{3+}$, $Y^{3+}$, $Th^{4+}$, $U^{4+}$, trans-$U^{4+}$; and the metal cation B is chosen from the group comprising: $W^{6+}$, $Re^{6+}$, $Mo^{6+}$, $Ta^{5+}$, $Nb^{5+}$, $Mo^{5+}$, $W^{5+}$.

In the respective definitions of the metal cations A and B, the symbol Ln denotes both lanthanum (La) and all the lanthanides, and the symbol trans-U denotes the transuranium elements, in particular neptunium (Np) and plutonium (Pu).

The present invention also relates to the process for the preparation of the compounds of the general formula I. In a first variant, these compounds are obtained by introducing nitrogen in the form of nitride or oxynitride into a solid reaction mixture. In this variant, a nitride, an oxynitride or an oxide of the metal A is reacted with a nitride, an oxynitride or an oxide of the metal B.

In a second variant of the process of the invention, a mixture consisting of an oxide or an oxide precursor of the metal A and an oxide or an oxide precursor of the metal B is subjected to nitridation under an atmosphere of reducing gas. This type of nitridation reaction is carried out for about 48 hours at a temperature of the order of 900° to 1000° C. In practice, it is advantageous to use ammonia gas as the nitriding and reducing agent. Finally, it may be specified that, in the case of a metal A of the alkaline earth type, the oxide precursor of the metal A will in general be advantageously chosen from the group comprising the carbonate and the oxalate.

In a third variant of the process of the invention, a mixed oxide of the metals A and B (or a mixture of mixed oxides), derived from the prior combination of the constituents of the mixture in the second variant, is subjected to nitridation under an atmosphere of reducing gas, in practice under ammonia gas.

The invention will be described below in greater detail with reference to a few particular examples of how the process of the invention is carried out, which are indicated simply by way of illustration.

EXAMPLE 1

Preparation of $BaTaO_2N$ from a nitride or oxynitride derivative (a) A pulverulent mixture of TaON and BaO in stoichiometric proportions is heated to a temperature of the order of 900° to 1000° C. in a refractory tube under an inert atmosphere, for example a nitrogen atmosphere. After completion of the reaction, $BaTaO_2N$ is obtained in the form of a brown powder.

(b) By appropriate modification of the relative proportions of the constituents of the initial pulverulent mixture, the same compound is obtained from $Ta_3N_5$, $Ta_2O_5$ and BaO.

EXAMPLE 2

Preparation of $BaTaO_2N$ from oxygen derivatives

The equipment used for this preparation is illustrated schematically in the single FIGURE attached. This assembly diagram shows that the equipment consists mainly of a horizontal electric furnace 1, a pythagorean refractory tube 2, a flowmeter 3, a bubbler containing liquid paraffin, 4, and the boat 5 containing the product.

At one end of the furnace 1, a three-way cock makes it possible to introduce an inert gas (nitrogen U) for purging the apparatus after cooling.

The flow rate of ammonia gas is monitored at the inlet and outlet of the furnace by means of the flowmeter 3 and the bubbler 4.

Using equipment of this type, an intimate mixture of barium carbonate and tantalum oxide in stoichiometric proportions is heated to about 900° to 1000° C. for 48 hours under an ammonia atmosphere. After the reaction, a brown product ($BaTaO_2N$) is recovered.

EXAMPLE 3

Preparation of $SrTaO_2N$ from a mixed oxygen derivative

In a first stage, strontium tantalate, $Sr_2Ta_2O_7$, is prepared by heating an intimate mixture of strontium carbonate and tantalum oxide in stoichiometric proportions to about 1400° C. in a muffle furnace.

In a second stage, an orange compound, $SrTaO_2N$, is obtained using the same equipment and conditions as in Example 2.

EXAMPLE 4

Preparation of $BaNbO_2N$ from oxygen derivatives

Following the procedure indicated in Example 2, the oxynitride $BaNbO_2N$ is obtained from barium carbonate and niobium oxide.

EXAMPLE 5

Preparation of $LaTaON_2$ from an oxygen derivative

In a first stage, lanthanum tantalate, $LaTaO_4$, is prepared by following the procedure indicated in Example 3 but replacing the strontium carbonate with lanthanum oxide.

In a second stage, a brown compound, $LaTaON_2$, is obtained using the same equipment and conditions as in Example 2.

EXAMPLE 6

Preparation of LaTiO$_2$N from a mixed oxygen derivative

In a first stage, lanthanum titanate, La$_2$Ti$_2$O$_7$, is prepared by heating an intimate mixture of lanthanum oxide and titanium oxide in stoichiometric proportions to about 1200° C. in a muffle furnace.

In a second stage, LaTiO$_2$N is obtained using the same equipment and conditions as in Example 2.

EXAMPLE 7

Preparation of NdTaON$_2$ from a mixed oxygen derivative

Following the procedure indicated in Example 5, but using neodynium oxide in the place of lanthanum oxide, the oxynitride NdTaON$_2$ is obtained by reaction of ammonia and the tantalate NdTaO$_4$.

EXAMPLE 8

Preparation of SmTaON$_2$ from a mixed oxygen derivative

Following the procedure indicated in Example 5, but using samarium oxide in the place of lanthanum oxide, the oxynitride SmTaON$_2$ is obtained by reaction of ammonia and the tantalate SmTaO$_4$.

Characterization of BaTaO$_2$N obtained in Example 2.

(a) determination of the nitrogen content

The quantity of nitrogen present in the sample analyzed was checked by considering firstly the loss in weight observed in the nitridation reactions and secondly the chemical analyses (quantitative nitrogen analysis).

In general, the results obtained are compatible overall with the formation of BaTaO$_2$N, which was also confirmed in the structural determination by neutron diffraction.

(b) thermogravimetric study

The action of oxygen was studied by thermogravimetric analysis in the case of BaTaO$_2$N. It starts at about 500° C. The product obtained after the temperature has risen to 1000° C. is in the form of a white powder. X-ray crystallographic analysis shows the presence of a mixture of two oxygen-containing phases: Ba$_5$Ta$_4$O$_{15}$ and BaTa$_2$O$_6$, but it is the quadratic variety of BaTa$_2$O$_6$ (ASTM data sheet 17-793) which is identified in the present case.

From the observed increase in weight, it is also possible to determine the nitrogen content of the initial oxynitride; its value confirms the results obtained previously.

(c) magnetic study

The colour change observed under a reducing atmosphere gave rise to the fear that a decrease in the oxidation state of Ta$^V$ may have taken place, imparting a paramagnetic behavior to the products.

A magnetic study by Faraday's method was therefore carried out in order to test this theory. No paramagnetic phase could be detected.

(d) dielectric study

The small losses observed in the dielectric study of the materials invalidate the theory of a possible reduction of the tantalum. The dielectric study was carried out on a simply annealed pellet. The curves representing the changes in the dielectric constant $\epsilon'$ and the loss angle tan $\delta$ as a function of the temperature were plotted for different samples of compounds of the formula I.

In all cases, it is seen that $\epsilon'$ remains constant within the temperature range between 90° and 370° K. for frequencies of 1, 10 and 100 KHz. These results were moreover confirmed on pellets of product which had been used for a preliminary sintering test.

In view of the fact that, for powder, the values of $\epsilon'$ are relatively high and remain constant and that the values of tan $\delta$ remain very small, the corresponding values for sintered ceramics will also be very interesting.

(d) X-ray crystallographic analysis

The checking of the samples by means of X-rays were performed systematically by graphic recording of the powder diagram using a diffractometer equipped with a proportional counter (copper K$\alpha$ monochromatic radiation: $\lambda = 1.5445$ Å, and nickel filter).

Examination of the diagrams obtained shows that the compounds ATaO$_2$N possess a cubic mesh of the perovskite type.

Table I below corresponds to the powder diagram of BaTaO$_2$N and Table II indicates the mean value of the cubic parameter for different compositions prepared.

TABLE I

Diffraction pattern of BaTaO$_2$N

| hkl (cub.) | $d_{obs.}$(Å) | I/I$_o$ |
|---|---|---|
| 100 | 4.13 | 4 |
| 110 | 2.917 | 100 |
| 200 | 2.062 | 26 |
| 210 | 1.843 | 1 |
| 211 | 1.681 | 38 |
| 220 | 1.456 | 15 |
| 310 | 1.303 | 15 |
| 222 | 1.188 | 5 |
| 321 | 1.100 | 18 |
| 400 | 1.029 | 3 |
| 330 | 0.969 | 11 |
| 420 | 0.919 | 9 |

TABLE II

Mean value of the cubic parameter (Å)

| PEROVSKITE COMPOUNDS | | | |
|---|---|---|---|
| BaTaO$_2$N | BaNbO$_2$N | SrTaO$_2$N | LaTaON$_2$ |
| 4.113 | 4.128 | 4.033 | 4.042 |

Structural study of BaTaO$_2$N by neutron diffraction

Examination of the X-ray diffraction pattern of BaTaO$_2$N shows a cubic mesh and indicates unambiguously that this compound possesses a structure of the perovskite type.

Because of their similar atomic numbers, it is not possible to differentiate between oxygen and nitrogen by X-ray diffraction and hence to detect any possible order between these two atoms, which would be seen as superlattice lines. To eliminate this ambiguity, this study was carried out by neutron diffraction. In fact, the Fermi lengths of oxygen and nitrogen are substantially different (bO = $0.58 \times 10^{-12}$ cm; bN = $0.94 \times 10^{-12}$ cm) and can therefore be distinguished.

The experimental method employed is the time-of-flight method using a statistical chopper. The following advantages of this method should be pointed out in this particular application:

the very good resolution, which makes it possible to detect a deformation in the mesh, and the possibility of obtaining a low-temperature spectrum in order to show an order-disorder transition.

The data are refined by means of a program for analyzing the diffraction line profile, which makes it possible to use a large number of lattice planes. In the interval between 3.00 and 0.54 Å, the data were refined over 74 independent hkl planes.

The various atoms were located in the following particular positions of the space group Pm3m:

| Atom | Position | x | y | z |
|---|---|---|---|---|
| Ba | 1(a) | 0 | 0 | 0 |
| Ta | 1(b) | ½ | ½ | ½ |
| (O,N) | 3(c) | 0 | ½ | ½ |

The oxygen and nitrogen atoms were distributed statistically over the 3(c) site and the following mean value was assigned to the Fermi length at this site:

$$b(O,N) = \frac{2\,bO + 1\,bN}{3} = 0.70 \cdot 10^{-12} \text{ cm.}$$

As the atoms are all in particular positions, the variables to be refined are as follows: four parameters defining the background, the parameter a of the cubic mesh, the scaling factor and the isotropic thermal agitation factors of the different atoms.

A minimum value of 0.0313 was obtained for the R factor on the line profile for the following values (at 293° K.):

$a = 4.1128(1)$ Å
B Ba$=0.43(5)$ Å$^2$
B Ta$=0.49(3)$
B(O,N)$=0.55(2)$.

During the refining procedure, a value of $6.5 \cdot 10^{-5}$ was given to the coefficient which fixes the line length, this value being slightly greater than the one generally assigned, namely about $4 \cdot 10^{-5}$. This is probably due to slightly imperfect crystallization of the sample studied.

To check the composition of this phase, additional calculations were performed by introducing the respective proportion of oxygen and nitrogen as a variable into the 3(c) site. The Fermi length b(O,N) defined in such that:

$$b(O,N) = \frac{(2 + x)\,bO + (1 - x)\,bN}{3}.$$

After refining, the value of x is not significantly different from O and the value of the R factor is equal to that previously obtained.

Finally, a neutron diffraction pattern was obtained at the temperature of liquid helium. This pattern can be directly superimposed on the one recorded at ordinary temperature. No order-disorder transition could therefore be detected.

Of course, the present invention is in no way restricted to the particular practical examples described above and it is perfectly possible to envisage a number of modified embodiments of the present invention without thereby exceeding its scope.

Thus, the present invention also covers the various solid solutions of the compounds of the formula I defined above, it being possible for these solid solutions to be easily obtained by adjusting the relative proportions of the constituents of the initial pulverulent mixture. The general formula of such intermediate solid solutions can then be represented by:

$$A_{1-x}A'_xB_{1-y}B'_yO_{3-n}N_n$$

in which:
A and A' are metal cations such as defined in the formula I for denoting A, and
B and B' are metal cations such as defined in the formula I in respect of B, it also being possible for B' to consist of any element capable of entering the octahedral site, $0 < n \leq 3$, it being possible for n to take fractional values, and $0 \leq x, y \leq 1$, complying, of course, with the balance between the cationic charges and the anionic charges.

The present invention moreover covers other solid solutions of the compounds of the general formula I defined above, in which the number of cations A and B is not limiting.

What is claimed is:

1. A nitrogen or oxynitrogen compound of perovskite structure, corresponding to the general formula I:

$$ABO_{3-n}N_n \qquad (I)$$

in which:
the cationic lattice consists of:
a metal cation A selected from the group consisting of: $Li^+$, $Na^+$, $K^+$, $Rb^+$, $Cs^+$, $Ag^+$, $Tl^+$, $Ca^{2+}$, $Ba^{2+}$, $Sr^{2+}$, $Pb^{2+}$, $Cd^{2+}$, $Ln^{3+}$, $Bi^{3+}$, $Y^{3+}$, $Th^{4+}$, $U^{4+}$, trans-$U^{4+}$; and
a metal cation B selected from the group consisting of: $W^{6+}$, $Re^{6+}$, $Mo^{6+}$, $Ta^{5+}$, $Nb^{5+}$, $Mo^{5+}$, $W^{5+}$, $Ti^{4+}$, $Zr^{4+}$, $Sn^{4+}$, $Ge^{4+}$, $Nb^{4+}$, $Ta^{4+}$, $Al^{3+}$, $Ga^{3+}$, $In^{3+}$, $Tl^{3+}$, $Fe^{3+}$, $Cr^{3+}$;
n=1, 2 or 3, and
the cationic charges a of the metal A and b of the metal B satisfy the equations:

$a+b=6+n$ $a \geq n$, and the solid solutions of these compounds.

2. An oxynitrogen compound as claimed in claim 1, which corresponds to the general formula Ia:

$$ABO_2N \qquad (Ia)$$

in which:
the metal cation A is selected from the group consisting of: $Li^+$, $Na^+$, $K^+$, $Rb^+$, $Cs^+$, $Ag^+$, $Tl^+$, $Ca^{2+}$, $Ba^{2+}$, $Sr^{2+}$, $Pb^{2+}$, $Cd^{2+}$, $Ln^{3+}$, $Bi^{3+}$, $Y^{3+}$, $Th^{4+}$, $U^{4+}$, trans-$U^{4+}$; and
the metal cation B is selected from the group consisting of: $W^{6+}$, $Re^{6+}$, $Mo^{6+}$, $Ta^{5+}$, $Nb^{5+}$, $Mo^{5+}$, $W^{5+}$, $Ti^{4+}$, $Zr^{4+}$, $Sn^{4+}$, $Ge^{4+}$, $Nb^{4+}$, $Ta^{4+}$, $Al^{3+}$, $Ga^{3+}$, $In^{3+}$, $Tl^{3+}$, $Fe^{3+}$, $Cr^{3+}$,
and the solid solution of these compounds.

3. An oxynitrogen compound as claimed in claim 1, which corresponds to the general formula Ib:

$$ABON_2 \qquad (Ib)$$

in which:

the metal cation A is selected from the group consisting of: $Ca^{2+}$, $Ba^{2+}$, $Sr^{2+}$, $Pb^{2+}$, $Cd^{2+}$, $Ln^{3+}$, $Bi^{3+}$, $Y^{3+}$, $Th^{4+}$, $U^{4+}$, trans-$U^{4+}$; and the metal cation B is selected from the group consisting of: $W^{6+}$, $Re^{6+}$, $Mo^{6+}$, $Ta^{5+}$, $Nb^{5+}$, $Mo^{5+}$, $W^{5+}$, $Ti^{4+}$, $Zr^{4+}$, $Sn^{4+}$, $Ge^{4+}$, $Nb^{4+}$, $Ta^{4+}$, and the solid solutions of these compounds.

4. A nitrogen compound as claimed in claim 1, which corresponds to the general formula Ic:

$$ABN_3 \qquad (Ic)$$

in which:
the metal cation A is selected from the group consisting of: $Ln^{3+}$, $Bi^{3+}$, $Y^{3+}$, $Th^{4+}$, $U^{4+}$, trans-$U^{4+}$; and the metal cation B is selected from the group consisting of: $W^{6+}$, $Re^{6+}$, $Mo^{6+}$, $Ta^{5+}$, $Nb^{5+}$, $Mo^{5+}$, $W^{5+}$, and the solid solutions of these compounds.

5. A process for the preparation of a compound of the general formula I as claimed in claim 1, which comprises reacting a nitride, an oxynitride or an oxide of the Metal A with a nitride, an oxynitride or an oxide of Metal B.

6. The process as claimed in claim 5, wherein the reaction is carried out at a temperature of the order of 900° to 1000° C. under an inert atmosphere, for example a nitrogen atmosphere.

7. A process for the preparation of a compound of the general formula I as claimed in claim 1, which comprises subjecting a mixture consisting of an oxide or an oxide precursor of the Metal A and an oxide or an oxide precursor of the Metal B to nitridation under an atmosphere of reducing gas.

8. A process for the preparation of a compound of the general formula I as claimed in claim 1, which comprises subjecting a mixed oxide of the Metals A and B, or a mixture of mixed oxides, derived from the prior combination of the constituents of the mixture of claim 7, to nitridation under an atmosphere of reducing gas.

9. The process as claimed in claim 7, wherein the nitridation reaction is carried out for about 48 hours at a temperature of the order of 900° to 1000° C.

10. The process as claimed in claim 8, wherein the nitridation reaction is carried out for about 48 hours at a temperature of the order of 900° to 1000° C.

11. The process as claimed in claim 7, wherein ammonia gas is used as the nitriding and reducing agent.

12. The process as claimed in claim 10, wherein the nitridation reaction is carried out for about 48 hours at a temperature of the order of 900° to 1000° C.

13. The process as claimed in claim 7, wherein, if A is an alkaline earth metal, the oxide precursor of the Metal A is selected from the group consisting of the carbonate and the oxalate.

14. The process as claimed in claim 13, wherein the nitridation reaction is carried out for about 48 hours at a temperature of the order of 900° to 1000° C.

15. A method of using the compounds of claim 1, for the manufacture of dielectric components, which comprises incorporating said compounds into dielectric components.

* * * * *

UNITED STATES PATENT AND TRADEMARK OFFICE
CERTIFICATE OF CORRECTION

PATENT NO.   : 4,734,390

DATED        : March 29, 1988

INVENTOR(S)  : Marchand et al

It is certified that error appears in the above-identified patent and that said Letters Patent is hereby corrected as shown below:

On The Title Page, Item [54] title of invention should read

-- (54) NITROGEN OR OXYNITROGEN COMPOUNDS HAVING A PEROVSKYTE STRUCTURE, THEIR PREPARATION AND THEIR APPLICATION TO THE MANUFACTURE OF DIELECTRIC COMPONENTS --.

Signed and Sealed this

Twentieth Day of December, 1988

*Attest:*

DONALD J. QUIGG

*Attesting Officer*   *Commissioner of Patents and Trademarks*